Figure 1:
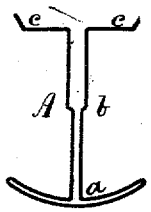

G. HAYES.

METALLIC SKYLIGHT BAR.

No. 10,582. Reissued Apr. 21, 1885.

WITNESSES:

Jacob Koch

Charles Hayes

INVENTOR

Geo Hayes.

UNITED STATES PATENT OFFICE.

GEORGE HAYES, OF NEW YORK, N. Y.

METALLIC SKYLIGHT-BAR.

SPECIFICATION forming part of Reissued Letters Patent No. 10,532, dated April 21, 1885.

Original No. 282,191, dated July 31, 1883. Application for reissue filed February 17, 1885.

*To all whom it may concern:*

Be it known that I, GEORGE HAYES, a resident of the city, county, and State of New York, have invented certain new and useful Improvements in Bars or Rafters for Skylights and other Glazed Structures, of which the following is a specification.

This invention has for its object lightness, cheapness, strength, and durability, combined with facility of glazing and reglazing; also, to effectually provide against leakage from any cause.

The nature thereof consists in the peculiar formation of the bar or rafter of which the skeleton of the skylight or other structure is composed. This bar or rafter I construct mainly of sheet metal, such as galvanized iron. It is provided with ledges to receive the glass plates and sustain them. It has a vertical central portion, from which the ledges extend laterally at the upper part, and I form of the same sheet at its lower part gutters to collect and carry off the water of condensation and leakage. So far this bar or rafter is composed of one piece of sheet metal folded upward as two halves, so that an under capping portion is formed of the same piece and no joint exposed below, and thereby all leakage between the two halves or sides entirely prevented. The glass-supporting ledges, vertical central portion, and gutters of the above-described bar are intended to be located below the glass plates and form the skeleton of the sash or skylight, and must be of a material possessing sufficient stiffness and strength for sustaining the weight of glass which this part of the bar is intended to carry and support. Next, for the purpose of securing the glass plates to the bar or rafter, I add to the same a device made of pliable, ductile, or flexible metal—such as lead or copper—formed into shape sectionally like a letter Y, it having a stem and two upwardly-spreading flanges or webs, each of single thickness of metal, and the three parts forming a triplicate of webs. The stem or lower web, for the purpose of attachment to the bar or rafter of rigid metal, is given somewhat greater width or depth than the others. The thickness of metal in the upper webs must be confined to that which will permit of ready bending. That of the lower web is not so material. The stem or lower web is placed down between the two sides, forming the vertical central portion of the part of the bar below the glass-supporting ledges to a proper distance, and thereto secured by any suitable means, so that it forms, when in combination therewith, an upward or outward continuation thereof, and, passing between the edges of the glass plates, has its upward branching webs above the glass plates. No part of this device is of doubled metal, and the flanges or upper webs, when in a structure after glazing, being of pliable or flexible material, are adapted to be readily and with easy facility pressed downward flat upon the glass plates, covering the joints between the edges of the glass and the stem or lower web, and thereby securing the same against leakage. When reglazing is necessary, the flanges or webs may be readily bent upward to their first position, allowing removal of glass and placing of new. The webs are again bent or flattened downward to secure the joint as before. The pliable material thus used admits of its being pressed tightly upon the glass, fitting closely into any inequalities of the upper surface thereof, and rendering the joint water-proof without the intervention of putty.

The invention further consists in the tripartite capping device as a means of securing glass plates to skylight bars or rafters to glazed roofs, and at the same time securing the joints against leakage, while permitting of ready repairs to the glazing. The combination of three webs or parts, as hereinbefore described, renders it peculiarly adaptable to secure those results. This device is made in long length, and may be sold in that form to the trade and by the buyer cut to suit his length of bar. It is not intended as a support, nor is it susceptible of such use.

I am aware that lead sash-bars have been used in stained-glass windows for churches, &c., but of such formation as to constitute grooves each side for the reception of the edges of the glass plates. An H-shaped bar placed sidewise is very old as a supporting-bar alone. Such would not answer the purpose for which this invention is adapted, nor secure the results obtainable from the peculiar construction of this device. Wherever lead bars have been used heretofore to support the glass, they had to be formed with lower flanges or portions as a bed for the plates, and were not formed with a stem susceptible of attachment to a rigid bar giving the support.

Pliable cap-plates formed of sheet metal doubled together are difficult of operation. They cannot be dressed or properly flattened down upon the glass plates, fitting thereto, without their breaking. They are also double the expense, and, being of necessity of lead or soft copper, they are comparatively more costly, owing to the extra amount of material used. Pliable cap-plates formed of sheet metal doubled where they come in contact with the vertical portion of the skylight-bar and at the points where they are riveted proved defective through leakage, the doubling up of the cap forming a trough or gutter conducting the water to the leaky points. Besides, the double thickness is a waste of material. In consequence of these difficulties pliable caps have not heretofore come into use.

Figure 2:
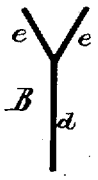
Figure 3:
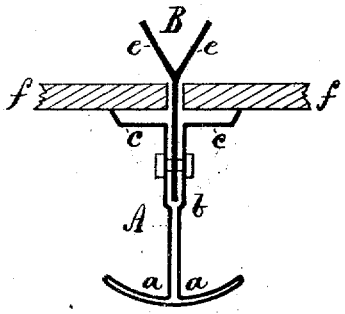
Figure 4:
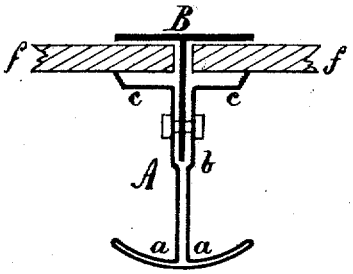

In the accompanying drawings, Figure 1 is a vertical section of the lower or supporting bar or rafter of rigid metal. Fig. 2 is a vertical section of the capping device of pliable or flexible metal. Fig. 3 is a vertical section of the two parts in combination, illustrating their condition previous to glazing. Fig. 4 is a vertical section of the same after glazing, the glass being shown in place and the joints covered by the flattened down webs of the triplicate capping device of pliable or flexible metal.

A represents the supporting bar or rafter of rigid metal.

B represents the capping device of pliable or flexible metal, having triplicate webs.

*a a* are the bar-gutters; *b*, the vertical central portion, and *c c* lateral flanges forming ledges to support glass plates. The vertical central portion with the ledges and gutters is shown as formed of one piece and constitutes the supporting bar or rafter A.

The capping device B is a triplicate of webs or flanges in combination. *d* is the one serving as a stem, and *e e* are the two upwardly-spreading flanges or webs. The stem-web is formed for attachment to the rigid metal bar beneath. The upper webs are for bending down over the glass after glazing to hold the glass plates to the supporting-bar and protect the joints against leakage.

The rigidity of the metal, aided by its shape and construction in the supporting-bar or rafter, renders it effectual in sustaining the glass, as shown at *f f*.

The flexibility or pliability of the capping device, together with its peculiar formation into triplicate webs, renders it effectual as a means for securing joints when glazed and facilitating reglazing when necessary.

The two parts of the bar are secured together by rivets or any suitable means, so that when combined they are as one.

The triplicate capping device may be applied to other bars for supporting glass plates, entering into combination therewith to effectuate the same results. It therefore may be made up in quantities and sold to the trade as an article of manufacture, to be applied by the buyers themselves to such other bars as they may desire.

What I claim as new, and desire to secure by Letters Patent of the United States, is—

1. A skylight bar or rafter composed of two parts, A B, in combination, the supporting-bar A of one piece of sheet metal having rigidity—such as galvanized iron—folded upward to form gutters *a a*, vertical central portion, *b*, and lateral flanges *c c*, for reception of glass plates, the part B of pliable or flexible metal—such as lead or copper—in shape sectionally as a letter Y, with triplicate webs, each of single thickness—the one forming stem *d* secured to bar A in the vertical central portion, *b*, thereof, and the webs *e e*, adapted to be bent horizontally after glazing, substantially as shown and described.

2. A separately-constructed triple-web device of flexible or pliable metal, for securing joints in glazing—one web, as a stem, adapted to be placed between joints to be secured thereby, and two other webs, branching upward therefrom at suitable angles, adapted to be bent or flattened down over the joints for securing the plates and protecting the joints against leakage, in combination with a sheet-metal supporting-bar in skylights or glazed structures, essentially as shown and described.

3. The tripartite device B of one thickness of pliable metal, having a stem-web, *d*, extending sufficient for attachment to a rigid sheet-metal supporting-bar (it being formed separately therefrom) for skylights and other glazed structures, and having two upward-branching webs or flanges, *e e*, adapted to be bent down over the joints after glazing, substantially as shown and described.

GEO. HAYES.

Witnesses:
JACOB J. KOCH,
CHARLES HAYES.